(No Model.)

M. C. CONWAY.
PNEUMATIC TIRE.

No. 549,766. Patented Nov. 12, 1895.

WITNESSES:
C. L. Bendixon
C. E. Tomlinson

INVENTOR:
Merritt C. Conway
BY E. Laass
his ATTORNEY.

UNITED STATES PATENT OFFICE.

MERRITT C. CONWAY, OF SYRACUSE, NEW YORK.

PNEUMATIC TIRE.

SPECIFICATION forming part of Letters Patent No. 549,766, dated November 12, 1895.

Application filed March 18, 1895. Serial No. 542,153. (No model.)

*To all whom it may concern:*

Be it known that I, MERRITT C. CONWAY, of Syracuse, in the county of Onondaga, in the State of New York, have invented new and useful Improvements in Pneumatic Tires, of which the following, taken in connection with the accompanying drawings, is a full, clear, and exact description.

This invention relates to the jackets or covers applied to the inflatable rubber tubes of pneumatic tires of bicycles and other vehicles.

The object of the invention is to form said jackets and wheel-rims with means for more securely uniting the marginal portions of the jacket and at the same time fastening the same more securely to the rim of the wheel without necessitating the employment of additional fastening devices; and to that end the invention consists in the improved construction and combination of parts, as hereinafter fully described, and specifically set forth in the claim.

Figure 1:
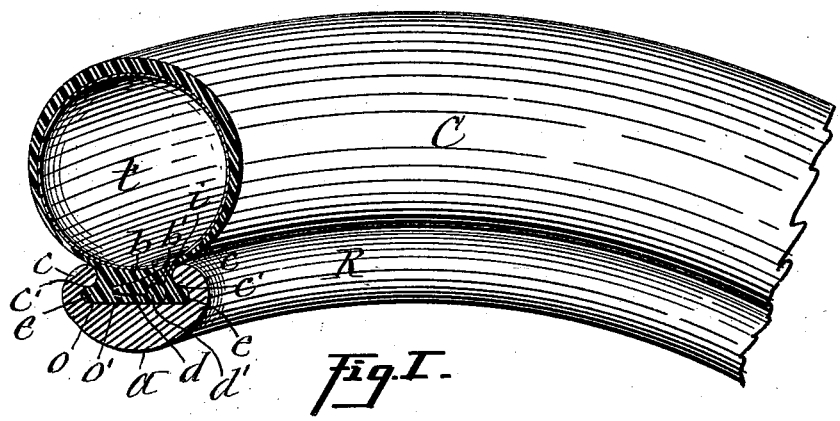
Figure 2:
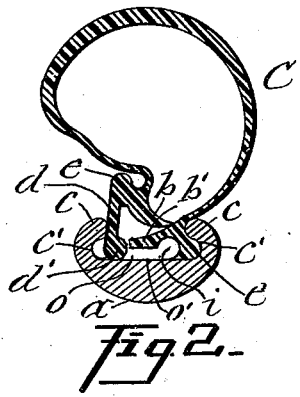
Figure 3:
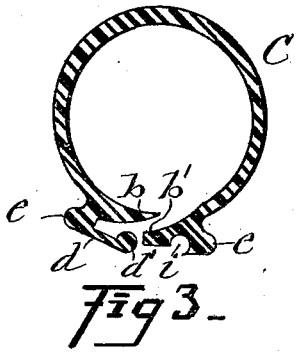

In the annexed drawings, Figure 1 is a transverse section of a bicycle-tire attached to the rim of the wheel by devices embodying my invention. Fig. 2 is a transverse section showing the jacket in position for removing it from the rim, and Fig. 3 is a transverse section of the jacket detached from the rim.

Similar letters of reference indicate corresponding parts.

R denotes the rim of the wheel, which rim is formed of wood and with a convexed surface $a$ on its inner side. The exterior of the rim is provided with the circumferential groove $o$, which I preferably form with the transversely-straight base $o'$ and with the overhanging continuous flanges $c\ c$, which form undercut side walls of the groove. These flanges or side walls I form with reverse-curved inner surfaces, as shown at $c'$ in Fig. 2 of the drawings, thereby obviating the liability of the jacket becoming cut by the edges of the rim. The said groove is comparatively shallow, and thus the strength of the rim is to a great extent unimpaired.

C represents the usual cover or jacket which envelopes the pneumatic tube $t$, as shown in Fig. 1 of the drawings. Said jacket I form with overlapping margins $b$ and $b'$ and also with a tongue $d$, extending from the jacket some distance from the edge of the margin $b$ and thence toward said edge. The opposite margin $b'$ is inserted between the tongue $d$ and adjacent margin $b$. These overlapping parts, however, do not in themselves accomplish the object of my invention without the addition of the following important structural features of my invention. In order to more effectually unite the overlapping margins of the jacket and more securely lock the same in the groove of the rim, I form the jacket with the circumferential ribs $e\ e$, which are inserted under the undercut or overhanging walls $c\ c$ of the groove and are rounded to conform to the reverse-curved surfaces of said walls, as shown in Fig. 1 of the drawings. The jacket is thus effectually interlocked with the rim. In addition to these fastenings I form the edge of the tongue $d$ with a circumferential rib $d'$, which is seated in a corresponding groove $i$, formed on the exterior of the margin $b'$, adjacent to the rib $e$. The two margins of the rim are thus effectually interlocked with each other.

In applying the tire to the rim of the wheel the aforesaid overlapping portions of the jacket are introduced into the groove $o$, and by inflating the tube $t$ said parts of the jacket become tightly wedged in the said groove, and the tongue $d$, with its ribs $d'$, becomes firmly interlocked with the grooved portion $i$ of the overlapping margin $b'$, so as to further insure the retention of said parts of the jacket within the groove of the rim $o$.

The jacket is readily removed from the rim when desired. The air being in such cases exhausted from the tube $t$ allows the jacket to be compressed and the tongue $b$ withdrawn from the groove of the rim, as illustrated in Fig. 2 of the drawings.

What I claim as my invention is—

In combination with the pneumatic tube, the wheel-rim having the groove —$o$— formed with undercut sides —$c$—$c$— and the jacket —C— having overlapping marginal portions —$b$—$b'$— and formed with the ribs —$e$—$e$— and with the groove —$i$— in the exterior of one of said marginal portions, the tongue —$d$— on the other marginal portion and the rib —$d'$— on the edge of said tongue entering the groove —$i$— substantially as set forth and shown.

In testimony whereof I have hereunto signed my name this 14th day of March, 1895.

MERRITT C. CONWAY. [L. S.]

Witnesses:
    C. L. BENDIXON,
    C. E. TOMLINSON.